United States Patent
Ohsawa (10) Patent No.: US 6,781,327 B2
(45) Date of Patent: Aug. 24, 2004

(54) DISCHARGE LAMP LIGHTING DEVICE

(75) Inventor: Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/339,400

(22) Filed: Jan. 10, 2003

(65) Prior Publication Data

US 2003/0137260 A1 Jul. 24, 2003

(30) Foreign Application Priority Data

Jan. 18, 2002 (JP) .................................. 2002-010232
Dec. 18, 2002 (JP) .................................. 2002-367222

(51) Int. Cl.$^7$ ............................................ H05B 37/02
(52) U.S. Cl. ................ 315/291; 315/224; 315/307; 315/209 R; 315/82
(58) Field of Search .............................. 315/291, 307, 315/224, 209 R, DIG. 2, DIG. 4, DIG. 5, DIG. 7, 82, 219

(56) References Cited

U.S. PATENT DOCUMENTS 4,749,913 A * 6/1988 Stuermer et al. ...... 315/DIG. 7
5,381,076 A * 1/1995 Nerone .................... 315/209 R
6,046,551 A * 4/2000 Kita ........................... 315/307
6,111,765 A * 8/2000 Ganser et al. ................ 363/55
6,486,620 B2 * 11/2002 Ito et al. ..................... 315/308

FOREIGN PATENT DOCUMENTS

EP          0 647 085 A1  *  4/1995
JP          2001-284092       10/2001

* cited by examiner

Primary Examiner—Don Wong
Assistant Examiner—Ephrem Alemu
(74) Attorney, Agent, or Firm—Sughrue Mion, PLLC (57) ABSTRACT

In a discharge lamp lighting device having a power source, a HID bulb (5), and an igniter (4), the power source supplies DC or AC voltage to the HID bulb (5), the igniter (4) applies a high voltage pulse to the HID bulb (5) in order to start a discharge therein. The power source has a starting power source (2) to supply a voltage to the HID bulb (5) at the starting of lighting and a steady lighting power source (1) for supplying a current to the HID bulb (5) during a steady lighting after the starting of lighting. A FET (7) as a switching semiconductor device switches the starting power source (2) and the steady lighting power source (1).

8 Claims, 7 Drawing Sheets

VOLTAGE OF NOT LESS THAN TWO OR MORE TIMES OF MAXIMUM VALUE OF RATED VOLTAGE

IGNITER PULSE

LIGHTING UP BY AC RECTANGULAR WAVE

FIG.7

VOLTAGE OF NOT LESS THAN 350 VOLTS

IGNITER PULSE

LIGHTING UP BY AC RECTANGULAR WAVE

FIG.8 PRIOR ART

DISCHARGE LAMP LIGHTING DEVICE

BACKGROUND OF THE INVENTION

1. Field of the Invention

The present invention relates to a discharge lamp lighting device for lighting a discharge lamp, especially, a high intensity discharge bulb (or a HID bulb) that is used as headlamps for vehicles, lighting devices for outdoor and indoor facilities, stock rooms, and factories, street lamps, and the like.

2. Description of the Related Art

A high intensity discharge bulb such as a metal halide bulb, a high pressure sodium bulb, and a mercury bulb has various features, a large luminous flux, a high lamp efficiency, and a long lifetime. They have therefore been widely used as lighting devices for outdoor and indoor facilities, stock rooms, and factories, street lamps, and the like.

In particular, recently, it has been used as a headlamp of vehicles. In order to light such a high intensity discharge bulb, it is necessary to apply a predetermined voltage to the bulb at the starting of lighting and further to apply to the bulb a high voltage pulse for the starting of lighting simultaneously. Accordingly, the discharge lamp lighting device has a ballast power source (DC/DC converter and so on) for lighting the discharge lamp with stability and an igniter (or a starter) for generating the high voltage pulse for starting.

Figure 8:
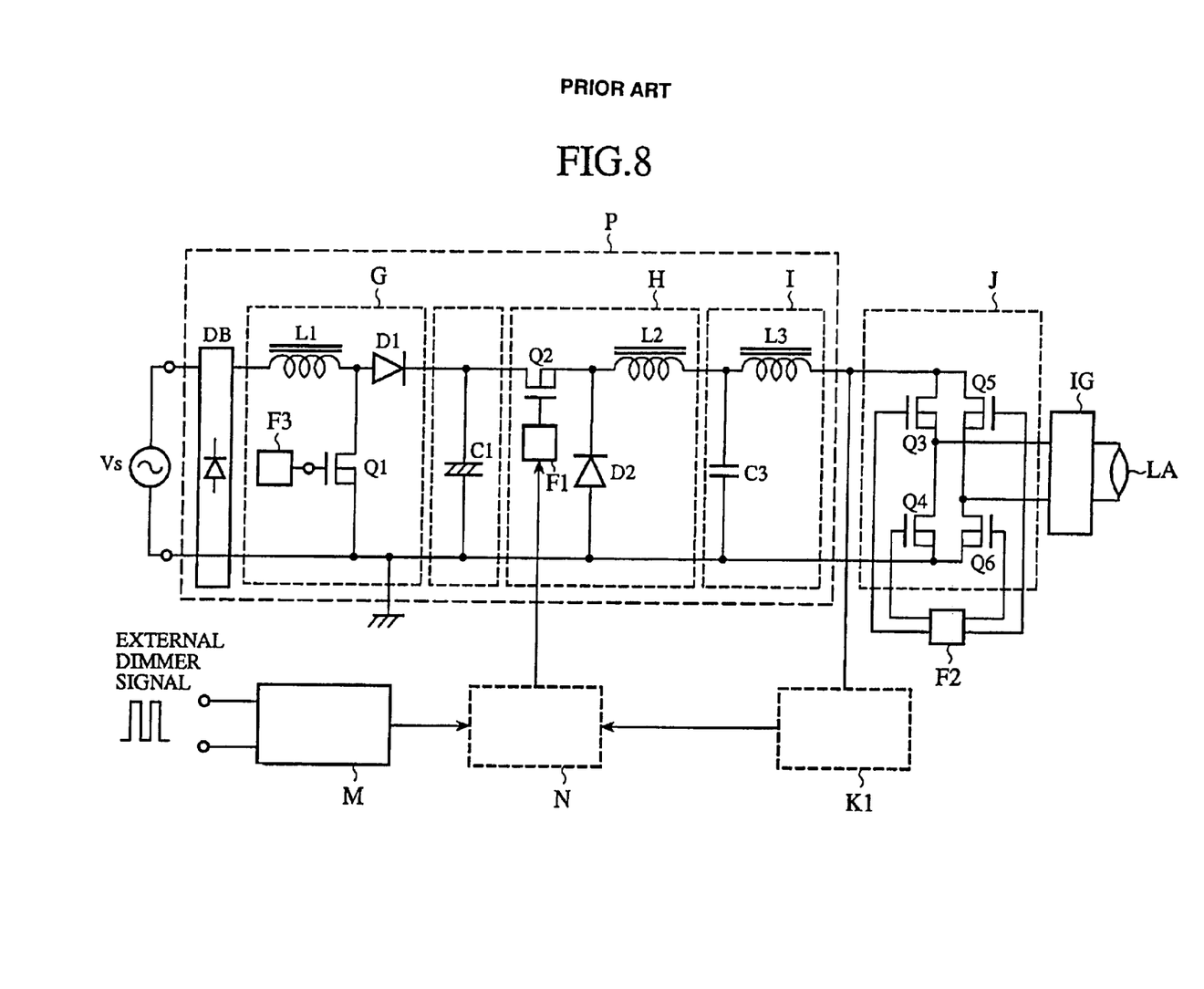
FIG. 8 is a circuit diagram showing a configuration of a conventional discharge lamp lighting device.

FIG. 8 is a circuit diagram showing a conventional discharge lamp lighting device that has been disclosed in a patent document, for example, Japanese laid-open publication number 2001-284092. This discharge lamp lighting device has a power conversion section P, which includes a rectifier circuit DB, a voltage conversion circuit G, and a power conversion circuit H, a polarity reverse circuit J, a control circuit N, and an igniter G.

In order to light the HID bulb LA, first, the rectifier circuit DB rectifies a commercial power source, and converts it to a direct current voltage (or DC voltage) The voltage conversion circuit G boosts the DC voltage rectified by the rectifier circuit DB to a predetermined voltage. The power conversion circuit H converts the output voltage from the voltage conversion circuit G to a voltage of a predetermined level according to a control signal transferred from the control circuit N. The polarity reverse circuit J converts the output voltage from the power conversion circuit H to an alternative current voltage (or AC voltage). The igniter IG generates a high voltage, for example, 20 KV and adds the generated one to the output from the polarity reverse circuit J. In the conventional discharge lamp lighting device having the configuration described above, the predetermined voltage is applied into the HID bulb LA at the starting of lighting. The high voltage pulse for starting the discharge of the HID lamp LA is then added into the predetermined voltage, and the added one is applied to the HID bulb LA. In the HID bulb LA, the discharge is thereby caused in the HID bulb LA filled with gas. After this, the discharge lamp lighting device supplies a current to the HID bulb and thereby the HID bulb lights up and then enters a stable lighting.

The conventional discharge lamp lighting device described above judges the type of the HID bulb connected thereto and provides the optimum electric power to the HID bulb according to the type of the HID bulb. However, because one power source (the power conversion section P) applies the voltage to the HID bulb in both the starting of the lighting and the continuously steady lighting, it is necessary for circuit elements forming the power source (as the power conversion section P) to have both the following characteristics: a withstand voltage characteristic for withstanding the voltage at the starting of lighting; and a continuous lighting characteristic for withstanding the continuously steady lighting. This thereby increases a cost of the circuit elements forming the power source and also increases a size of the discharge lamp lighting device.

SUMMARY OF THE INVENTION

The present invention has been made to solve the above conventional drawback of the discharge lamp lighting device. It is therefore an object of the present invention to provide a discharge lamp lighting device in which one or more power sources and bridge circuit are made up of low-priced circuit elements and it is thereby possible to reduce the manufacturing cost of the discharge lamp lighting device.

In accordance with an aspect of the present invention, there is provided a discharge lamp lighting device having a power source and an igniter. The power source supplies a DC voltage or an AC voltage to a discharge lamp or bulb. The igniter applies a high voltage pulse to the discharge lamp in order to start the discharge in the discharge lamp. The power source has a starting power source and a steady lighting power source which are switched according to the condition, the starting of lighting and a continuously steady lighting. The light starting power source applies a voltage to the discharge bulb at the starting of lighting. The steady lighting power source supplies a current during the continuously steady lighting after the starting of lighting.

In accordance with another aspect of the present invention, there is provided a discharge lamp lighting device having a power source and an igniter. The power source supplies a DC voltage or an AC voltage to a discharge lamp or bulb. The discharge lamp lighting device can be applied to a discharge lamp (or a bulb) whose steady lighting voltage is not more than 60 volts. A bridge circuit in the power source is made up of withstand voltage elements of 200–250 volts. The igniter applies a high voltage pulse to the discharge lamp in order to start the discharge therein.

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

First Embodiment

Figure 1:
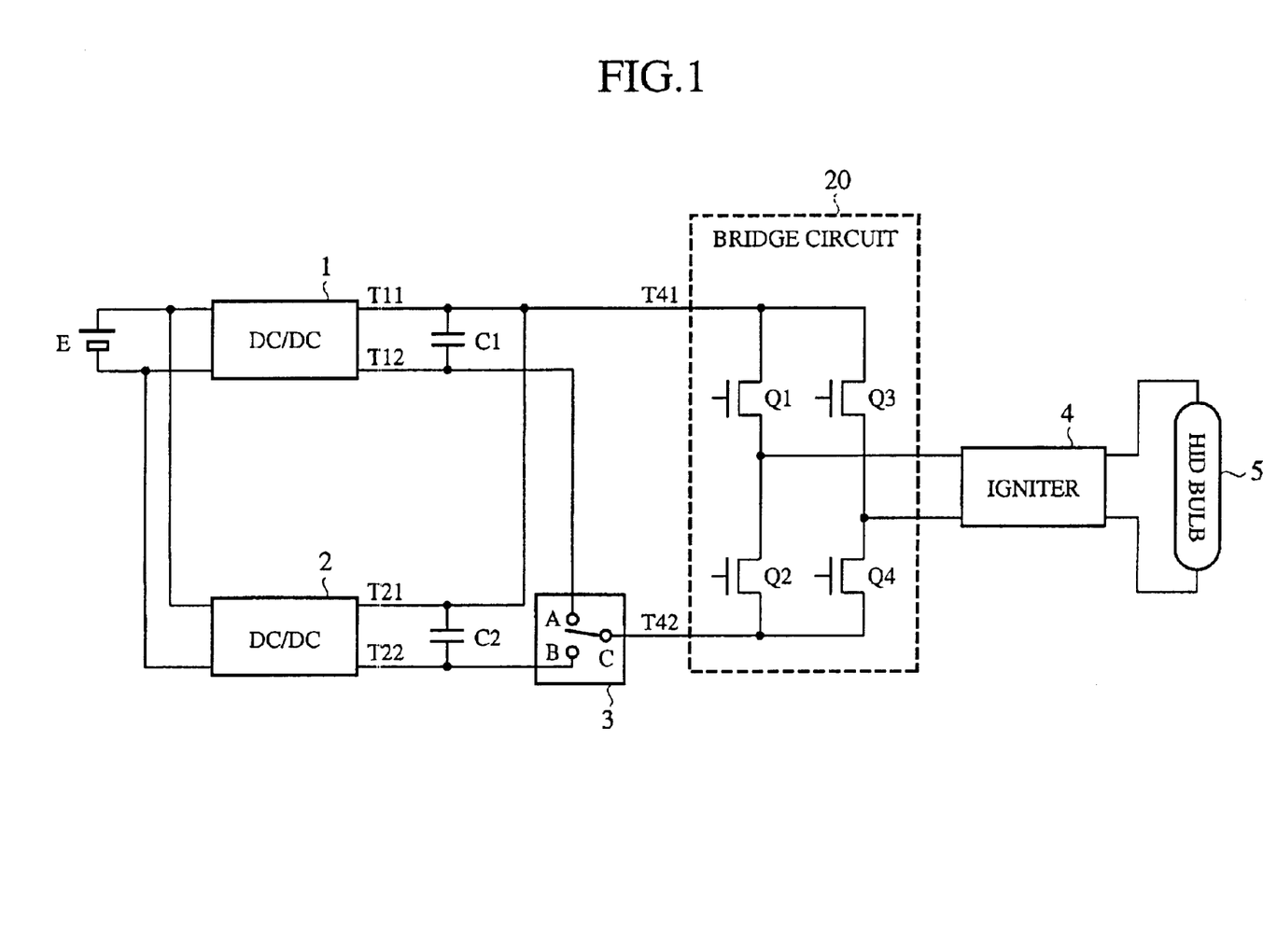
FIG. 1 is a circuit diagram showing a configuration of a discharge lamp lighting device according to a first embodiment of the present invention.

FIG. 1 is a circuit diagram showing a configuration of a discharge lamp lighting device according to a first embodiment of the present invention. The discharge lamp lighting device has a power source and an igniter 4. The power source has a direct current (DC) power source E, a steady lighting power source 1 for steady lighting, a starting power source 2 for starting, capacitors C1 and C2, a switch 3, and a bridge circuit 20. This discharge lamp lighting device lights a HID bulb 5.

In order to adapt a continuous output rating, the steady lighting power source 1 is so formed that it outputs a rated voltage for the HID bulb 5 so as to flow a rated output current continuously. That is, the steady lighting power source 1 can output a current and a voltage with a low ripple. The DC/DC converter is used as this steady power source 1, for example, which converts the DC voltage from the DC power source E to the rated voltage and then outputs the converted one. A smoothing capacitor C1 is connected between one output terminal T11 of the steady power source 1 and the other output terminal T12 thereof.

In order to adapt a short time rating, the starting power source 2 is so formed that it generates a predetermined voltage (whose voltage level is three or four times of the maximum level of the rated voltage) to be applied before the HID bulb 5 occurs a breakdown and it can flow a necessary output current in a short time.

In the starting power source 2, the ripple of the current and voltage is not taken into consideration. The DC/DC converter is used as the starting power source 2, for example, which converts the DC voltage form the DC power source E to the predetermined voltage described above and then outputs the converted one. A smoothing capacitor C2 is connected between one output terminal T21 of the starting power source 2 and the other output terminal T22 thereof.

The output terminal T11 of the steady lighting power source 1 is connected to one input terminal T41 of the bridge circuit 20, and the output terminal T12 is connected to a first input terminal A of the switch 3.

The output terminal T21 of the starting power source 2 is connected to the input terminal T41 of the bridge circuit 20, and the output terminal T22 is connected to a second input terminal B of the switch 3. The switch 3 connects one of the first input terminal A and the second input terminal B to a common terminal C. The common terminal C in the switch 3 is connected to the other input terminal T42 of the bridge circuit 20.

The DC voltage outputted from the steady lighting power source 1 is smoothed by the capacitor C1 and the smoothed DC voltage is applied to the bridge circuit 20 through the switch 3. The DC voltage outputted from the starting power source 2 is smoothed by the capacitor C2 and the smoothed DC voltage is applied to the bridge circuit 20 through the switch 3.

The bridge circuit 20 is made up of switching elements Q1, Q2, Q3, and Q4 and a drive circuit (not shown). One group of the switching elements Q1 and Q2 and another group of the switching elements Q3 and Q4 are arranged in parallel to each other.

During the steady lighting, a pair of the switching elements Q1 and Q4 and another pair of the switching elements Q2 and Q3 are switched ON and OFF alternately according to a driving signal from the driver circuit (not shown). Thereby, the polarity of the DC voltage outputted from the steady lighting power source 1 is inverted alternately, so that a alternating voltage is generated. The generated alternating voltage is supplied to the HID bulb 5 through the igniter 4.

On the other hand, at the starting of lighting, only a pair of the switching elements Q1 and Q4 is ON according to a driving signal from the driver circuit (not shown). The predetermined voltage outputted from the starting power source 2 is thereby supplied to the HID bulb 5 through the igniter 4. This bridge circuit 20 is also called to as "a polarity reverse circuit."

The igniter 4 generates a high voltage pulse for the starting of lighting of the HID bulb 5. The igniter 4 adds the generated high voltage pulse to the predetermined voltage supplied from the starting power source 2 through the bridge circuit 20, and outputs the added voltage to the HID bulb 5. The discharge phenomenon thereby occurs in the HID bulb 5 filled with gas.

Next, a description will now be given of the operation of the discharge lamp lighting device having the above configuration according to the first embodiment.

First, when the HID bulb 5 is started, the switch 3 connects the common terminal C to the second input terminal B. The predetermined voltage from the starting power source 2 is supplied to the HID bulb 5 through the bridge circuit 20 and the igniter 4. In this situation, the igniter 4 adds the generated high voltage pulse, which is generated in the igniter 4 itself, to the predetermined voltage obtained from the starting power source 2 through the bridge circuit 20, and outputs the added voltage to the HID bulb 5. The discharge thereby occurs in the HID bulb 5 filled with the gas. The HID bulb 5 then lights up.

After this, the switch 3 connects the first input terminal A to the common terminal C. The DC voltage from the steady lighting power source 1 is thereby applied to the bridge circuit 20. The bridge circuit 20 converts the DC voltage from the steady lighting power source 1 to the alternating voltage by changing its polarity, and then supplies the alternating voltage to the HID bulb 5 through the igniter 4. The HID bulb 5 thereby lights up continuously by a rectangle wave of the alternating voltage.

Because the conventional discharge lamp lighting device shown in FIG. 8 has only one power source (as the power conversion section P) which generates and supplies to the HID bulb both the predetermined voltage at the starting of lighting and the voltage for the steady lighting, it is necessary to generate the high level voltage at the starting of lighting and it is thereby necessary to use a transformer in the power source, the number of turns of the coil in this transformer is increased. Further, in order to flow a large current during the continuously steady lighting, it is also necessary to use the coil of a large diameter. In addition, it is necessary to use diodes of a high withstand voltage in the rectifier circuit in the power source in order to withstand a high voltage to be used at the starting of lighting of the HID bulb 5. Still furthermore, in order to flow a large amount of a current during the steady lighting, it is necessary to use the diodes of a large capacity in the rectifier circuit. As a result, it is necessary to use large and higher-priced elements, the manufacturing cost of the conventional discharge lamp lighting device becomes high.

On the contrary, according to the discharge lamp lighting device of the first embodiment described above, because the starting power source 2 is sufficient only to adapt the short time rating, it is not necessary to consider any temperature derating for heating. Further, because the withstand voltage is high, but the amount of the current flow is low, it is possible to use the transformer of a thin coil and thereby to use a low-priced rectifier diode of a small size. Further, because the steady lighting power source 1 requires a large current capacity, but a low withstand voltage, it is possible to reduce the number of turns of the coil in its transformer. This can use a low-priced rectifier diode of a small size.

The discharge lamp lighting device of the first embodiment can be applied to the HID bulb using mercury and further applied to other HID bulb which does not use mercury.

Second Embodiment

Figure 2:
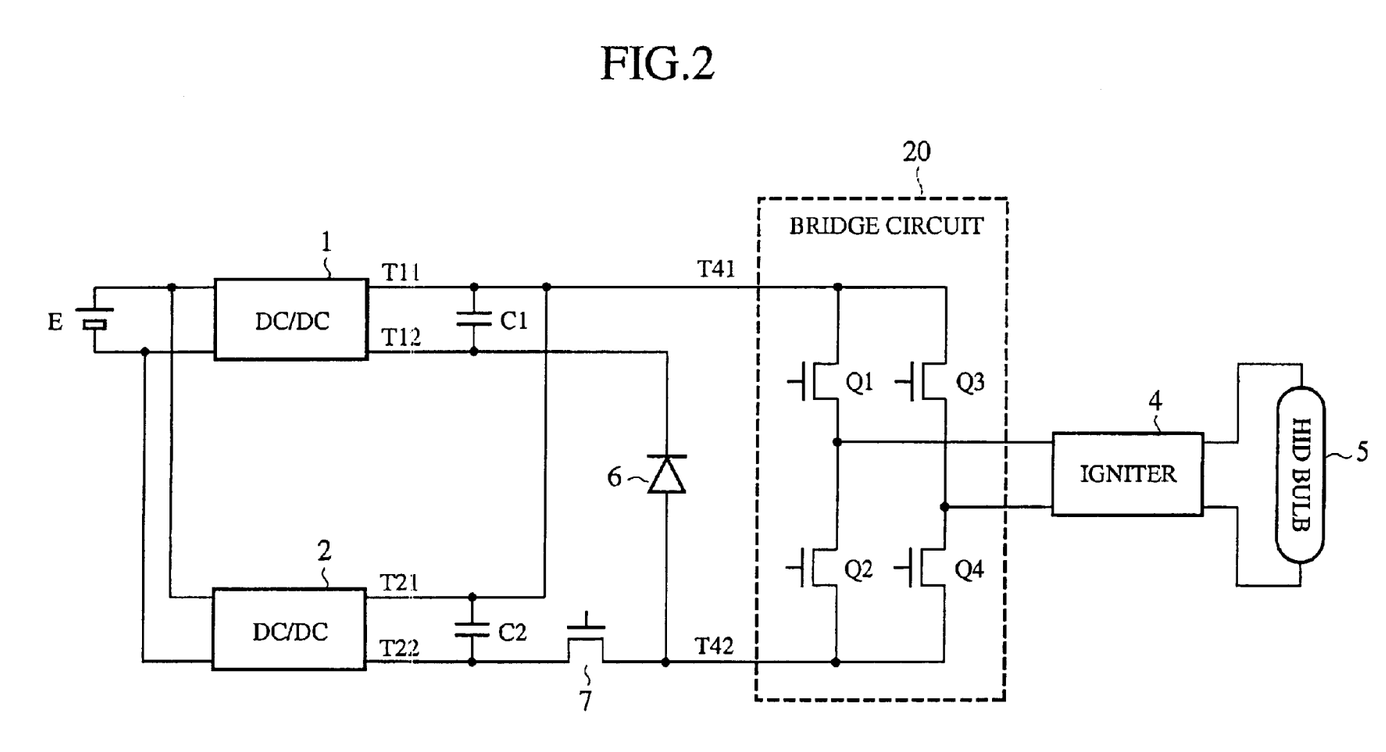
FIG. 2 is a circuit diagram showing a configuration of a discharge lamp lighting device according to a second embodiment of the present invention.

In the discharge lamp lighting device of a second embodiment of the present invention, the switch 3 in the discharge lamp lighting device of the first embodiment is made up of a diode and a field effect transistor (or a FET).

FIG. 2 is a circuit diagram showing a configuration of the discharge lamp lighting device according to the second embodiment of the present invention. Hereinafter, the same components of the first embodiment will be referred with the same reference numbers and the explanation for them is omitted here.

Instead of the switch 3 in the discharge lamp lighting device of the first embodiment, the diode 6 and the connection FET 7 are used in the discharge lamp lighting device of the second embodiment. The diode 6 is placed between the output terminal T12 of the steady lighting power source 1 and the input terminal T42 of the bridge circuit 20. The connection FET 7 is placed between the output terminal T22 of the starting power source 2 and the input terminal T42 of the bridge circuit 20.

The connection FET 7 corresponds to a switching semiconductor device capable of controlling the connection to the starting power source 2 and to prevent one way current flowing into the starting power source 2. Because the voltage of the output terminal T22 of the starting power source 2 is always lower than that of the output terminal T12 of the steady lighting power source 1, the diode 6 is capable of passing the current in one direction (namely, the forward direction) flowing into the steady lighting power source 1 when the starting power source 2 is separated in connection from the HID bulb 5. Further, the diode 6 is capable of preventing the reverse current from the steady lighting power source 1 when the starting power source 2 is connected to the HID bulb 5.

Next, a description will now be given of the operation of the discharge lamp lighting device having the above configuration according to the second embodiment.

First, when the discharge of the HID bulb 5 is started, the connection FET 7 is entered ON according to a control signal transferred from a control circuit (not shown). The predetermined voltage from the starting power source 2 is thereby supplied to the HID bulb 5 through the bridge circuit 20 and the igniter 4. In this situation, the igniter 4 generates a high voltage pulse therein and adds the generated one to the predetermined voltage obtained from the starting power source 2 through the bridge circuit 20, and outputs the added voltage to the HID bulb 5. The discharge thereby occurs in the gas filled in the HID bulb 5. The HID bulb 5 lights up.

After this, the connection FET 7 is entered OFF by the control signal transferred from the control circuit (not shown). The diode 6 is thereby biased in forward direction and the DC voltage from the steady lighting power source 1 is applied to the bridge circuit 20. The bridge circuit 20 converts the DC voltage from the steady lighting power source 1 to the alternating voltage by changing its polarity, and then supplies the alternating voltage to the HID bulb 5 through the igniter 4. The HID bulb 5 thereby lights up continuously by a rectangle wave of the alternating voltage.

The connection FET 7 is connected to the starting power source 2 supplying a high voltage by the control circuit of GND-5 Volts or GND-12 Volts. The operation of the connection FET 7 can be controlled based on a driving method using an insulating type pulse transformer or a level shift circuit using a stated current circuit. Because the driving of the connection FET 7 requires a gate current only at the moment of the switching, the capacitor C2 is charged through a diode component formed between the base and collector of a PNP transistor to be used as a gate driving buffer amplifier (for the connection FET 7) during the continuous ON state, and the gate current which is necessary to the next ON of the connection FET 7 is generated by the charged capacity accumulated in the condenser C2. The connection FET 7 can be thereby driven at high speed.

According to the discharge lamp lighting device of the second embodiment, in addition to the effect of the first embodiment described above, it is possible to reduce the size and cost of the components in the power source in the discharge lamp lighting device because the switch 3 is made up of the diode 6 and the connection FET 7.

Third Embodiment

Figure 3:
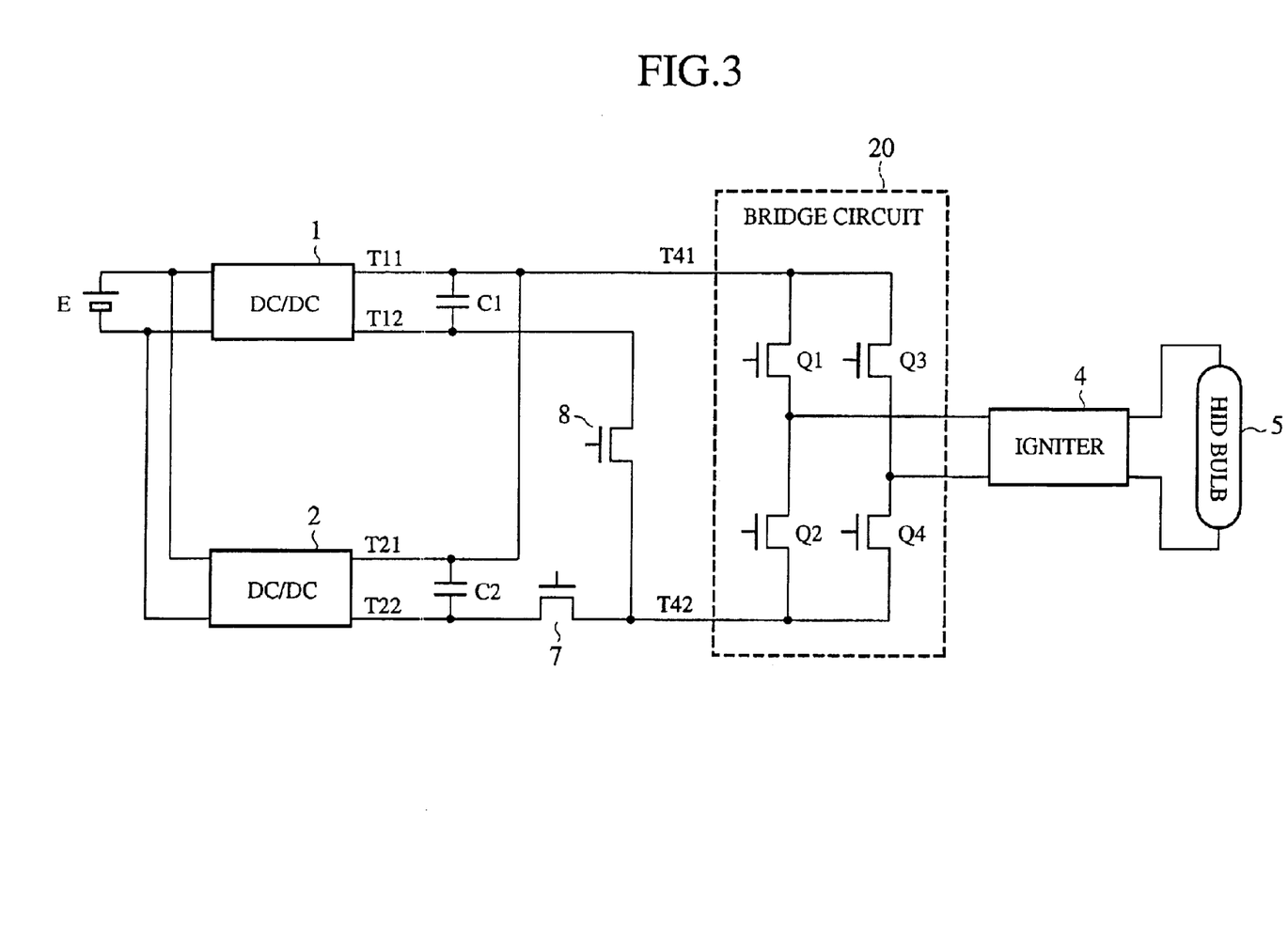
FIG. 3 is a circuit diagram showing a configuration of a discharge lamp lighting device according to third and fifth embodiments of the present invention.

In the discharge lamp lighting device of a third embodiment of the present invention, the diode 6 in the discharge lamp lighting device of the second embodiment is replaced with a FET having a parasitic diode.

FIG. 3 is a circuit diagram showing a configuration of the discharge lamp lighting device according to the third embodiment of the present invention. Hereinafter, the same components of the second embodiment will be referred with the same reference numbers and the explanation for them is omitted here.

In the discharge lamp lighting device of the third embodiment, instead of the diode 6 used in the discharge lamp lighting device of the second embodiment, a FET 8 with a parasitic diode is placed between the output terminal T12 of the steady lighting power source 1 and the input terminal T42 of the bridge circuit 20. The FET 8 is entered OFF when the starting power source 2 is connected to the HID bulb 5 in order to prevent the reverse current flowing from the steady lighting power source 1. On the other hand, this FET 8 is entered ON when the steady lighting power source 1 is connected to the HID bulb 5 in order to pass the one way current flowing into the steady lighting power source 1.

Next, a description will now be given of the operation of the discharge lamp lighting device having the above configuration according to the third embodiment.

First, when the discharge of the HID bulb 5 is started, the connection FET 7 is entered ON and the FET 8 is entered OFF according to a control signal transferred from a control circuit (not shown). The parasitic diode in the FET 8 prevents the reverse current flowing from the steady lighting power source 1, and the predetermined voltage from the starting power source 2 is supplied to the HID bulb 5 through the bridge circuit 20 and the igniter 4. In this situation, the igniter 4 generates a high voltage pulse therein and adds the generated one to the predetermined voltage obtained from the starting power source 2 through the bridge circuit 20, and outputs the added voltage to the HID bulb 5. The discharge thereby occurs in the HID bulb 5 filled with the gas. The HID bulb 5 then lights up.

After this, the connection FET 7 is entered OFF and the FET 8 is entered ON by the control signal transferred from the control circuit (not shown). The FET 8 prevents the current flowing into the starting power source 2 and the DC voltage from the steady lighting power source 1 is applied to the bridge circuit 20. In this case, because the FET 8 operates so that the source and drain thereof are shorted, no voltage drop occurs in the forward direction by the parasitic diode. That is, the voltage drop of the FET 8 becomes very small.

The bridge circuit 20 converts the DC voltage from the steady lighting power source 1 to the alternating voltage by changing its polarity, and then supplies the alternating voltage to the HID bulb 5 through the igniter 4. The HID bulb 5 thereby lights up continuously by a rectangle wave of the alternating voltage.

According to the discharge lamp lighting device of the third embodiment, the FET 8 operates so that the source and drain thereof are shorted when the current is supplied from the steady lighting power source 1 to the HID bulb 5. Accordingly, because the voltage drop in the FET 8 becomes extremely small when compared with the loss obtained by multiplying the forward voltage drop and the current generated in the diode 6 in the second embodiment, it is possible to form the discharge lamp lighting device with a relatively low loss.

Fourth Embodiment

Figure 4:
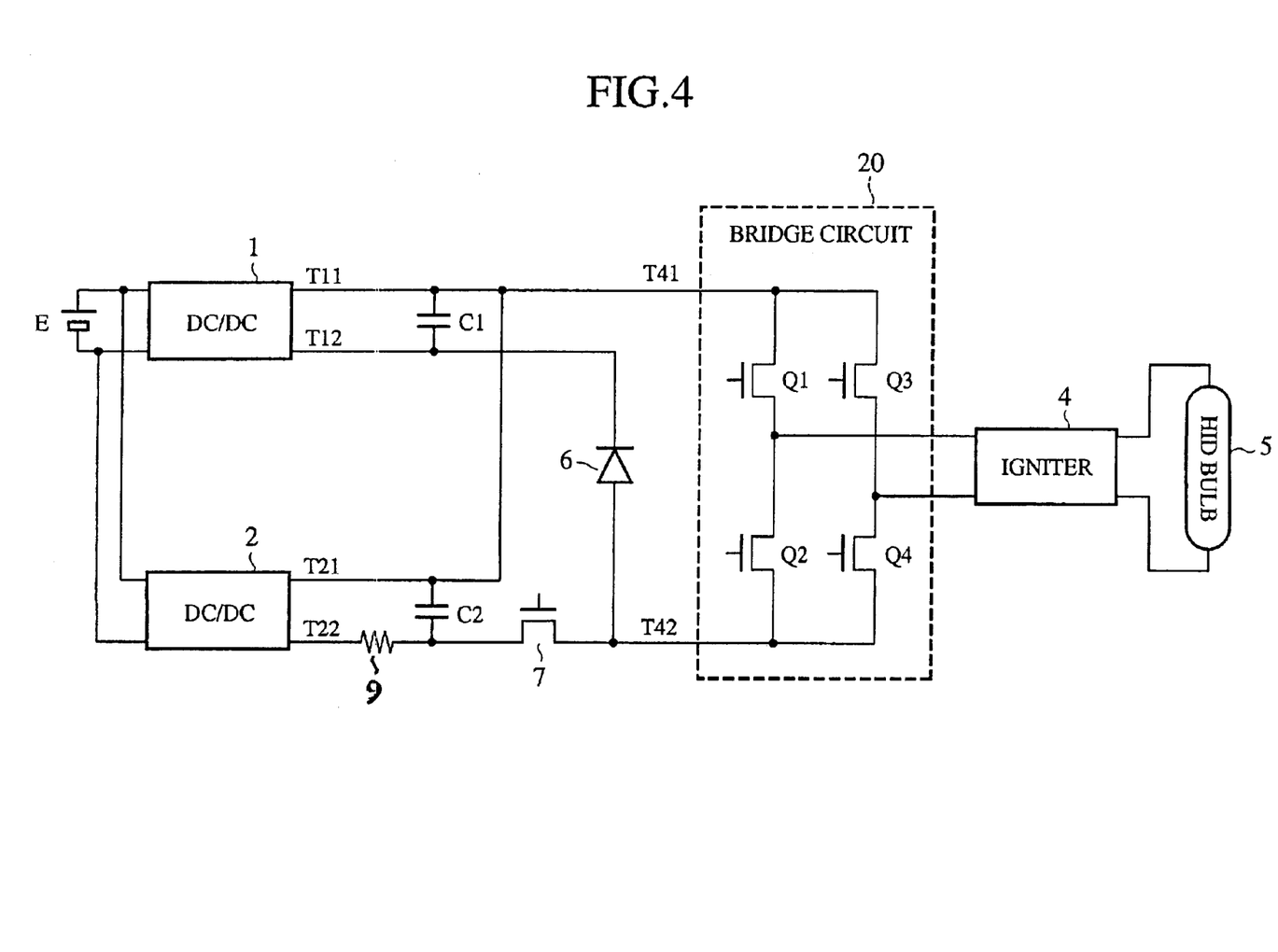
FIG. 4 is a circuit diagram showing a configuration of a discharge lamp lighting device according to a fourth embodiment of the present invention.

In the discharge lamp lighting device of a fourth embodiment of the present invention, a current limit resistance 9 is added between the output terminal T22 of the starting power source 2 and the connection FET 7 in the configuration of the discharge lamp lighting device of the fourth embodiment.

FIG. 4 is a circuit diagram showing a configuration of the discharge lamp lighting device according to the fourth embodiment of the present invention. Hereinafter, the same components of the second embodiment will be referred with the same reference numbers and the explanation for them is omitted here.

In the discharge lamp lighting device of the fourth embodiment, one terminal of the current limit resistance 9 is connected to the output terminal T22 of the starting power source 2, and the other terminal thereof is connected to the connection node between the connection FET 7 and the capacitor C2.

Because the operation of the discharge lamp lighting device of the fourth embodiment is almost equal to that of the second embodiment, only the difference will now be explained.

When the voltage of the starting power source 2 is switched to the current of the steady lighting power source 1, there happens a case that the starting time to supply the current to the HID bulb 5 is delayed by a bad response to the steady lighting power source 1. The current limit resistance 9 can prevent the occurrence of this phenomenon. That is, in the discharge lamp lighting device which controls so that the current to the HID bulb 5 becomes a constant, the amount of the current outputted from the steady lighting power source 1 is increased by limiting the current from the starting power source 2 by the current limit resistance 9. Accordingly, because even if a part of the current to be supplied to the HID bulb 5 from the steady lighting power source 1 flows at the starting of lighting of the HID bulb 5, the HID bulb 5 can light up continuously, never goes out, at the moment of the switching from the starting power source 2 to the steady lighting power source 1.

According to the fourth embodiment, because the current to be supplied to the HID bulb 5 can flow continuously, namely, the flow of the current never stops even if the delay of the response to the steady lighting power source 1 occurs, it is possible to form the discharge lamp lighting device so that the HID bulb 5 is continuously lights up.

Fifth Embodiment

The discharge lamp lighting device of a fifth embodiment of the present invention can realize the same operation of that of the fourth embodiment described above by controlling the resistance value between the source and drain of the connection FET 7 in the discharge lamp lighting device of the second embodiment.

The discharge lamp lighting device of the fifth embodiment has the same configuration of that of the second embodiment shown in FIG. 2.

Because the operation of the discharge lamp lighting device of the fifth embodiment is almost equal to that of the second embodiment, only the difference will now be explained.

In the discharge lamp lighting device of the fifth embodiment, when the predetermined voltage of the starting power source 2 applied to the HID bulb 5 is switched to the current of the steady lighting power source 1 to be supplied to the HID bulb 5, the control circuit (not shown) generates a control signal in order to increase in analogue the resistance value between the source and drain of the connection FET 7. The control circuit outputs the generated control signal to the gate of the connection FET 7. This control signal finally turns OFF the connection FET 7. Thereby, like the discharge lamp lighting device of the fourth embodiment, the amount of the current outputted from the steady lighting power source 1 is increased and a part of the current to be supplied to the HID bulb 5 from the steady lighting power source 1 flows even if it is at the starting for lighting of the HID bulb 5. When the connection to the HID bulb 5 is switched from the starting power source 2 to the steady lighting power source 1, the current to be supplied to the HID bulb 5 can flow continuously, not stops. Finally, the starting power source 2 is completely disconnected from the HID bulb 5, and the steady power source 1 is connected to the HID bulb 5 instead.

It is possible to increase in analogue the resistance value between the drain and source of the connection FET 7 by gradually reducing in analogue the voltage of the gate and source of the connection FET 7. In addition, when a CPU of GND/5 Volts sets two types of time constant to a level shift circuit of GND/12 Volts, it is possible to realize a high response of the discharge lamp lighting device in addition to the function of the analogue operation described above.

According to the fifth embodiment, when the starting power source 2 is disconnected form the HID bulb 5 and the steady lighting power source 1 is connected to the HID bulb 5 instead, the resistance value of the connection FET 7 connected to the starting power source 2 is in analogue increased in order to gradually decrease the amount of the current outputted from the starting power source 2. Thereby, in the discharge lamp lighting device which controls so that the current to be supplied to the HID bulb 5 becomes constant, the amount of the current outputted from the steady lighting power source 1 is gradually increased. Finally, when the starting power source 2 is completely disconnected form the HID bulb 5 by entering OFF the connection FET 7, all the current flowing to the HID bulb 5 is supplied from the steady lighting power source 1. Accordingly, the current can be supplied to the HID bulb 5 continuously without interrupt even if a response delay to the steady lighting power source 1 occurs. It is thereby possible that the HID bulb 5 lights up continuously.

Sixth Embodiment

Figure 5:
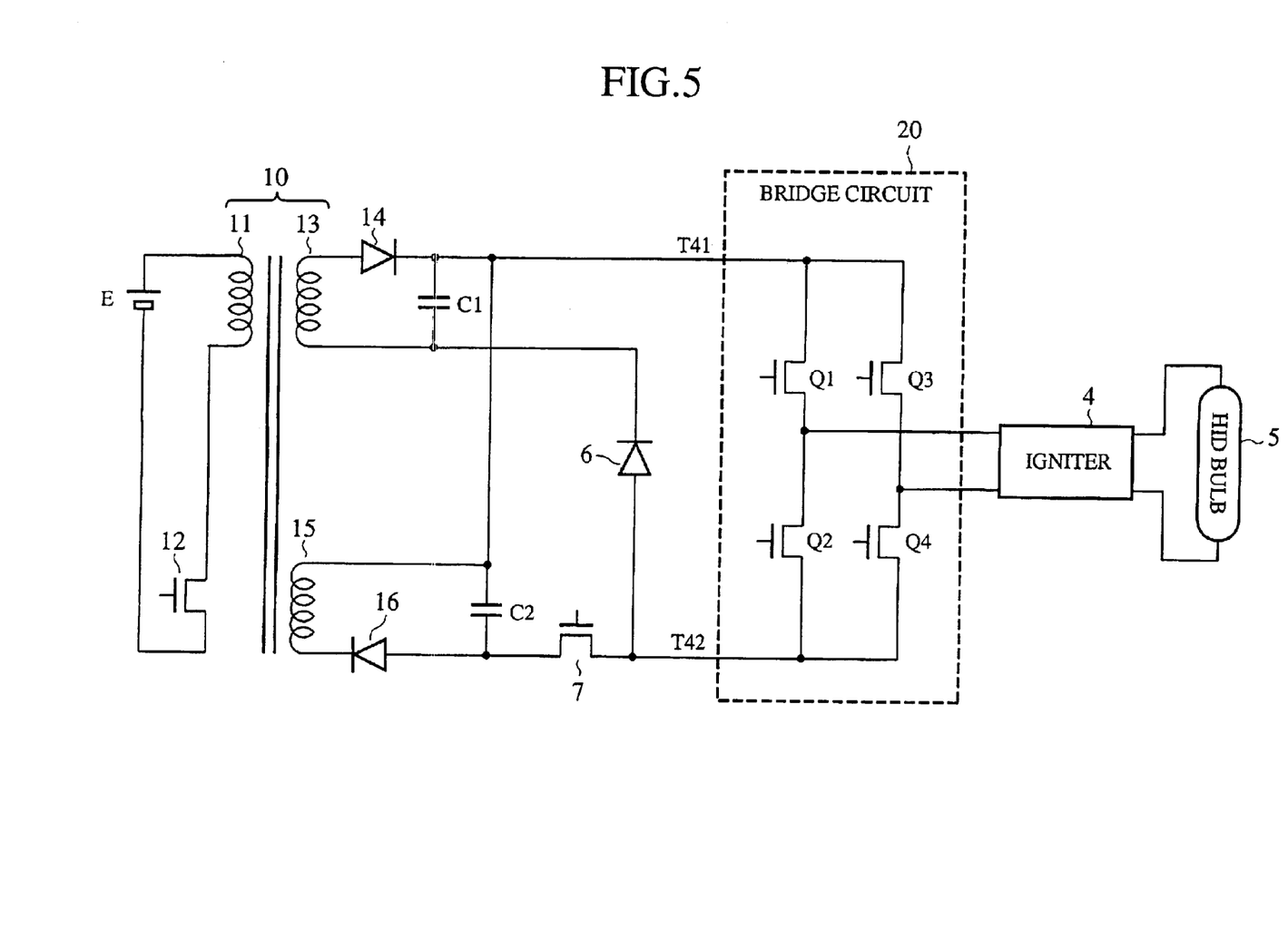
FIG. 5 is a circuit diagram showing a configuration of a discharge lamp lighting device according to a sixth embodiment of the present invention.

In the discharge lamp lighting device of a sixth embodiment, one transformer is commonly used as both the transformer in the DC/DC converter as the steady lighting power source 1 and the transformer in the DC/DC converter as the starting power source 2.

FIG. 5 is a circuit diagram showing a configuration of the discharge lamp lighting device according to the sixth embodiment of the present invention. Hereinafter, the same components of the second embodiment will be referred with the same reference numbers and the explanation for them is omitted here.

In general, the DC/DC converter to be used as the DC power source is made up of a transformer, a switching element connected in series to a primary winding of this transformer in order to interrupt the DC voltage, and a rectifier diode connected in series to a secondary winding of the transformer.

In the discharge lamp lighting device of the sixth embodiment, a transformer 10 having a secondary winding, one part 13 of is used as a part of the starting power source and the other part 15 of which is used as a secondary winding of the steady lighting power source. The steady lighting power source has the transformer 10, a FET 12, and a rectifier diode 14. The FET 12 is connected in series to the primary winding 11 of the transformer 10. The FET 12 controls to supply and halt the DC voltage. The rectifier diode 14 is connected in series to the part 13 of the secondary winding of the transformer 10. The starting power source has the other part 15 of the secondary winding of the transformer 10 and a rectifier diode 16 connected in series to the other part 15 of the secondary winding of the transformer 10. Thus, the primary winding 11 of the transformer 10 and the FET 12 are commonly used in both the steady lighting power source and the starting power source.

The configuration of the sixth embodiment can realize the same function of the steady lighting power source 1 and the starting power source 2 in the discharge lamp lighting device of the second embodiment.

According to the sixth embodiment, the steady lighting power source and the starting power source are made up of the DC/DC converter in which one transformer 10 is commonly used, instead of the configuration of the other embodiments in which the DC/DC converters as the steady lighting power source 1 and the starting power source 2 are independently to each other. Accordingly, the configuration of the discharge lamp lighting device of the sixth embodiment can reduce the number of the components in the power source. It is therefore possible to provide the discharge lamp lighting device of a small size with a low cost.

Seventh Embodiment

The first through sixth embodiment described above can provide the technique to reduce the withstand voltage of the electric elements forming the power sources as low as possible. In particular, the seventh embodiment can provide a technique to reduce the withstand voltage of the elements forming the bridge circuit in the power source.

The configuration of the discharge lamp lighting device of the seventh embodiment may be the same of that of any one of the first through sixth embodiments.

Figure 6:
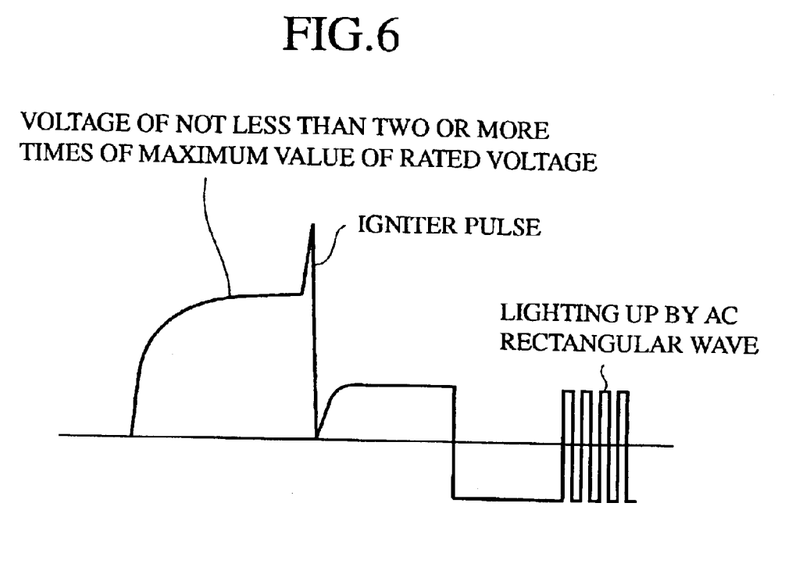
FIG. 6 is a diagram showing an explanation of a voltage to be applied to a HID bulb, not using mercury, for use in a discharge lamp lighting device according to a seventh embodiment of the present invention.

FIG. 6 is a diagram showing an explanation of a voltage change applied to the HID bulb, whose steady lighting voltage is not more than 60 Volts, until it enters the steady lighting from the occurrence of the breakdown, in the discharge lamp lighting device according to the seventh embodiment of the present invention.

First, the starting power source 2 for use during the steady lighting applies the voltage (approximately not less than 100 Volts) to the discharge lamp. This voltage is not less than two times of the maximum value of the rated voltage (50.4 Volts) obtained by adding the stated voltage 42 Volts of the discharge lamp and its tolerance of 20 percentages. Thereby, the discharge lamp will take place a breakdown by a high voltage pulse generated by the igniter 4. In the seventh embodiment, this discharge lamp does not use zinc and the like instead of the mercury commonly used in the HID bulb (hereinafter, this discharge lamp used in the seventh embodiment will be referred to as a HID bulb 5' not using mercury).

When the HID bulb 5' not using mercury takes place the breakdown by applying the high voltage pulse from the igniter 4, the starting power source 2 starts to supply the current to the HID bulb 5' not using mercury. When the current flows into the HID bulb 5' continuously, the current supply from the starting power source 2 is switched to the current supply form the steady lighting power source 1. After this switching process, for example, a microcomputer (not shown) controls the operation of the bridge circuit 20 in order to switch the polarity of the applied voltage to the HID bulb 5' not using mercury. The alternating voltage made up of a rectangle wave is thereby supplied to the HID bulb 5'. The HID bulb 5' not using mercury lights up steadily and continuously.

Before the occurrence of the breakdown of the HID bulb 5' not using mercury, when the voltage (approximately not less than 100 Volts) is applied to this HID bulb 5', it is thereby possible to supply an adequate amount of the current into the HID bulb 5' having the maximum electrode voltage of approximately 50 volts in the state where the HID bulb 5' is adequately heated by the continuous lighting. As a result, including the case where the HID bulb 5' lights up immediately after it lights out, it is possible to continue the current flow to the HID bulb 5' even if immediately after the occurrence of the breakdown of the HID bulb 5'. This can achieve the stable lighting.

Figure 7:
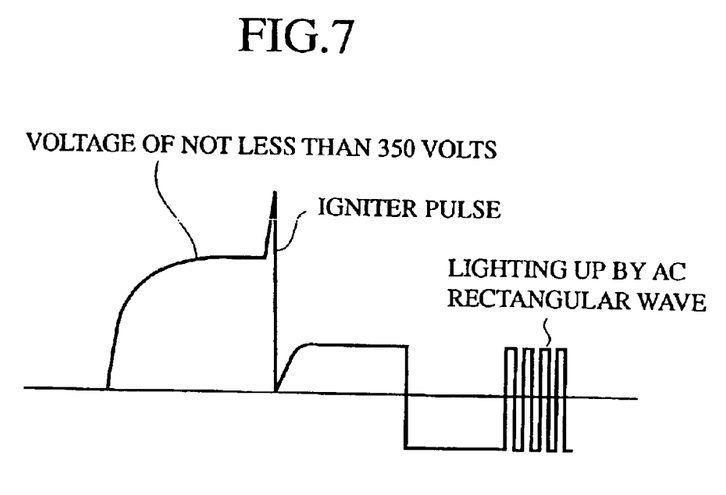
FIG. 7 is a diagram showing an explanation of a voltage to be applied to a HID bulb of mercury for use in a discharge lamp lighting device according to a seventh embodiment of the present invention.

FIG. 7 shows the voltage change outputted from the discharge lamp lighting device for lighting the HID bulb 5 using mercury. In this discharge lamp lighting device, the voltage to be supplied to the HID bulb 5 before the starting of the breakdown for lighting is approximately 400 Volts (in general, a recommended voltage for the HID bulb 5 using mercury is not less than 350 Volts). This voltage is a necessary voltage in order to continuously flow the current to the electrodes of the HID bulb 5 which has taken place the breakdown by the high voltage pulse from the igniter 4. In particular, the HID bulb 5 which is adequately heated during a long lighting, in other words, this voltage is a necessary voltage to light the HID bulb 5 again immediately after the thermo-stable HID bulb 5 lights out. In the thermo-stable HID bulb 5, a metal (mercury) filled therein is adequately evaporated and the voltage between the electrodes of the HID bulb 5 becomes the rated voltage (the voltage 85 Volts between the electrodes is greatly effected by the characteristic of the mercury vapor). Thereby, the voltage (of approximately 400 Volts) is recommended for the voltage to be applied to the HID bulb 5 before the starting of lighting. This voltage (approximately 400 Volts) is capable of adequately flowing the current into the HID bulb 5 having the maximum voltage in a scattering range of the bulb voltage even if not less than the rated voltage.

The mercury is in general filled in the HID bulb in order to discharge it at a high voltage when the HID bulb lights up by applying the rated voltage, that is, in order to discharge the HID bulb with a low current.

A description will now be given of the explanation regarding the predetermined voltage to be applied to the HID bulb before the breakdown.

The explanation of the seventh embodiment described above shows the method how to light the HID bulb 5' not using mercury where the predetermined voltage of not less than two times of the rated voltage including its tolerance is applied to the HID bulb 5' before the occurrence of the breakdown. However, it is necessary to have a margin of the predetermined voltage of not less than two times of the rated voltage including the tolerance in order to light the HID bulb 5' certainly without any failure in lighting.

In order to light the HID bulb 5' not using mercury under all cases while taking into consideration all particular uncertain elements included in the discharge lamps, it is realistic that the predetermined voltage to be applied to the HID bulb 5' before the occurrence of the breakdown is a voltage of not less than three times of the maximum value of the rated voltage of the HID bulb 5'. This voltage is obtained by adding the tolerance of 20 percentages to the rated voltage 42 Volts of the HID bulb 5' not using mercury.

Because an available discharge lamp lighting device has a limitation about the applied voltage, the upper limit of the output voltage of the discharge lamp lighting device is determined based on the rating of electric components used in the discharge lamp lighting device. To select and use super high voltage components as electric parts in the discharge lamp lighting device is meaningless in cost because those high voltage components are expensive.

A description will now be given of the switching elements Q1 to Q4 made up of FETs, as an example of the electric components, to be used in the bridge circuit 20 in the discharge lamp lighting device.

In general, because the FET of a high voltage specification has a large ON resistance, the FET of a low voltage specification of a small ON resistance between the drain and source should be therefore used. When the predetermined voltage to be applied to the HID bulb 5 before the occurrence of the breakdown is a voltage of four times of the maximum value of the rated voltage which is obtained by adding the tolerance of 20 percentages to the rated voltage 42 Volts of the HID bulb 5' not using mercury, the rated current becomes approximately equal to the object specification and it is thereby desirable to apply it to the component of the discharge lamp lighting device.

By the way, because a commercial power of AC 100 volts is supplied to every home, electric elements of 100 Volts withstand voltage are used in household electric appliances, and a unit cost of the electric element is cheaper and its withstand voltage is about 200–250 Volts. In order to provide a low-priced discharge lamp lighting device, it is preferred to use those low-priced electric elements of 200–250 Volts which are available easily in the market and widely used in the household electric appliances.

In the discharge lamp lighting device for lighting the HID bulb 5' not using mercury, like the seventh embodiment, the predetermined voltage to be supplied to the HID bulb 5' before the occurrence of the breakdown can be generated by the power source including the bridge circuit 20 and the starting power source 2 using the low-priced electric components of 200–250 withstand voltage.

The discharge lamp lighting device of the seventh embodiment has the following feature.

That is, the discharge lamp lighting device has the power source and the igniter. The power source supplies DC and AC voltages to the HID bulb (as a discharge lamp) and the igniter applies the high voltage pulse to the HID bulb in order to start the discharge therein. The predetermined voltage is applied to the HID bulb while adding the high voltage pulse into the predetermined voltage. Thereby, the HID bulb starts the discharge therein. In particularly, the seventh embodiment has the following feature. In the discharge lamp lighting device lights the HID bulb not using mercury, the predetermined voltage to be supplied to the HID bulb before the occurrence of the breakdown therein is a voltage of not less than two times (approximately not less than 100 Volts) of the maximum value of the rated voltage which is obtained by adding the tolerance of 20 percentages to the rated voltage of 42 Volts of the HID bulb not using mercury. As shown in FIG. 6, when the voltage of not less than two times of the rated voltage including the tolerance is applied to the HID bulb before the occurrence of the breakdown, it is possible to flow the adequate current to the electrode voltage (approximately 50 Volts) of the HID bulb which has been heated by the continuous lighting. As a result, even if it is a time immediately after the breakdown takes place in the HID bulb, it is possible to supply the current to the HID bulb, so that the HID bulb can light up without lighting out.

Further, according to the discharge lamp lighting device of the seventh embodiment, the predetermined voltage to be supplied to the HID bulb before the occurrence of the breakdown therein is a voltage of three or four times of the maximum value of the rated voltage which is obtained by adding the rated voltage of 42 Volts of the HID bulb not using mercury and the tolerance of 20 percentages. In general, it is possible to light the HID bulb not using mercury while the voltage of not less than two times of the rated voltage including the tolerance described above is applied to the HID bulb before the occurrence of the breakdown therein. In order to increase the ability of the lighting, that is, in order to avoid any failure of lighting of the HID bulb not using mercury, it is necessary to add a margin to the voltage of two times of the rated voltage. Accordingly, it is preferred to use the voltage of not less than three times of the maximum value of the rated voltage obtained by adding the tolerance of 20 percentages to the rated voltage 42 Volts of the HID bulb. Furthermore, although the upper limit of the voltage to be applied is determined based on the rating of the electric components used in the discharge lamp lighting device, it is meaningless in cost to select and use super high voltage components as electric parts in the discharge lamp lighting device. For example, in general, because the FET of a high voltage specification has a large ON resistance between the drain and source thereof, FETs of a low voltage specification having a low ON resistance between the drain and source thereof should be used. Thus, it is realistic that the predetermined voltage to be applied to the HID bulb before the occurrence of the breakdown is set to a voltage of approximately not less than four times of the maximum value of the rated voltage obtained by adding the tolerance of 20 percentages to the rated voltage 42 Volts of the HID bulb not using mercury. In this case, it is possible to use low-priced FETs which have been used widely and commonly in household electric appliances.

As set forth, according to the present invention, the discharge lamp lighting device has the starting power source to supply the voltage to the discharge lamp at the starting of lighting and the steady lighting power source to supply the voltage to the discharge lamp in the continuously steady lighting after the starting. Because both the power sources are switched, it is possible to use the electric components of a short time rating of a small current and a high withstand voltage in the starting power source and to use the electric components of a large current, a low withstand voltage, and continuous time rating in the steady lighting power source. It is thereby possible to use the electric components of a low cost.

Furthermore, according to the present invention, the discharge lamp lighting device has the power source to supply DC voltage or AC voltage to the discharge lamp and the igniter to apply the high voltage pulse to start the discharge in the discharge lamp. The discharge lamp lighting device lights the discharge lamp whose steady lighting voltage is not more than 60 Volts. Because the bridge circuit in the power source is made up of electric components of 200–250 withstand voltage which are widely used and also easily available in the market, it is possible to form a low-priced discharge lamp lighting device.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A discharge lamp lighting device comprising:
 a power source for supplying a voltage to a discharge lamp, the power source comprising:
 a starting power source for applying a voltage to the discharge lamp in order to start the discharge in the discharge lamp; and
 a steady lighting power source for supplying a current to the discharge lamp during a continuously steady lighting of the discharge lamp after the starting of discharge therein,
 an igniter for applying a high voltage pulse to the discharge lamp at the starting of lighting of the discharge lamp,
 wherein a part of a secondary winding of a transformer forming the steady lighting power source is used as a secondary winding of a transformer of the starting power source, and
 a primary winding of the transformer of the steady lighting power source and a primary winding of the transformer of the starting power source are commonly used.

2. The discharge lamp lighting device as claimed in claim 1, further comprises switching means for switching the starting power source and the steady lighting power source according to a state of the lighting of the discharge lamp.

3. The discharge lamp lighting device as claimed in claim 2, wherein the switching means for switching the starting power source and the steady lighting power source comprises:
 a diode placed between the steady lighting power source and the discharge lamp; and
 a switching semiconductor device placed between the starting power source and the discharge lamp.

4. The discharge lamp lighting device as claimed in claim 2, wherein the switching means for switching the starting power source and the steady lighting power source comprises:
 an FET having a parasitic diode placed between the steady lighting power source and the discharge lamp; and
 a switching semiconductor device placed between the starting power source and the discharge lamp.

5. The discharge lamp lighting device as claimed in claim 2, further comprises a resistance placed in series between the switching means and the starting power source.

6. The discharge lamp lighting device as claimed in claim 2, ON/OFF operation of a switching semiconductor device as the switching means placed between the starting power source and the discharge lamp is controlled by gradually increasing a resistance value between source and drain of the switching semiconductor device in order to switch the starting power source and the steady lighting power source.

7. A discharge lamp lighting device comprising:
 a power source for supplying a voltage to a discharge lamp whose continuously steady lighting voltage is not more than 60 Volts; and
 an igniter for applying a high voltage pulse to the discharge lamp at a starting of lighting of the discharge lamp,
 wherein the power source comprises a bridge circuit made up of withstand voltage elements of 200 to 250 Volts connected to the igniter.

8. The discharge lamp lighting device as claimed in claim 1, wherein the discharge lamp lighting device lights the discharge lamp whose continuously steady lighting voltage is not more than 60 Volts, and
 the power source further comprises a bridge circuit made up of withstand voltage elements of 200 to 250 Volts connected to the igniter.

* * * * *